(12) United States Patent
Walster et al.

(10) Patent No.: US 6,915,320 B2
(45) Date of Patent: Jul. 5, 2005

(54) TERMINATION CRITERIA FOR THE ONE-DIMENSIONAL INTERVAL VERSION OF NEWTON'S METHOD

(75) Inventors: G. William Walster, Cupertino, CA (US); Eldon R. Hansen, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 669 days.

(21) Appl. No.: 09/927,270

(22) Filed: Aug. 9, 2001

(65) Prior Publication Data

US 2003/0033339 A1 Feb. 13, 2003

(51) Int. Cl.$^7$ .............................................. G06F 7/38
(52) U.S. Cl. ........................................................ 708/446
(58) Field of Search ........................... 708/270, 440, 708/446

(56) References Cited

U.S. PATENT DOCUMENTS

| | | | | |
|---|---|---|---|---|
| 5,220,524 A | * | 6/1993 | Hesson | 708/502 |
| 5,631,858 A | * | 5/1997 | Narita et al. | 708/443 |
| 2004/0015830 A1 | * | 1/2004 | Reps | 717/104 |

OTHER PUBLICATIONS

Publication: "Design, implementation and evaluation of the constraint language cc (FD)" by Pascal Van Hentenryck et al., The Journal of Logic Programming 37, 1998, pp. 139–164.

E.R. Hansen, "Global Optimization Using Interval Analysis," Marcel Dekker, Inc., New York, NY, 1992.

R.B. Kearfott, "A Fortran 90 Environment for Research and Prototyping of Enclosure Algorithms fo Nonlinear Equations and Global Optimization," ACM Transactioins on Mathematical Software, vol. 21, No. 1, Mar. 1995, pp. 63–78 http://interval.louisiana.edu/preprints.html.

R. B. Kearfott, Algorithm 763: Interval Arithmetic: A Fortran 90 Module for an Interval Data Type, ACM Trans. Math. Software, 22, vol. 4, 1996, pp. 385–392. http://interval.louisiana.edu/preprints.html.

(Continued)

*Primary Examiner*—Chuong Dinh Ngo
(74) *Attorney, Agent, or Firm*—Park, Vaughan & Fleming LLP

(57) ABSTRACT

One embodiment of the present invention provides a system for finding zeros of a function, $f$, within an interval, X, using the interval version of Newton's method. The system operates by receiving a representation of the interval X. This representation including a first floating-point number, a, representing the left endpoint of X, and a second floating-point number, b, representing the right endpoint of X. Next, the system performs an interval Newton step on X, wherein the point of expansion is the midpoint, x, of the interval X. Note that performing the interval Newton step involves evaluating $f(x)$ to produce an interval result $f'(x)$. If $f'(x)$ contains zero, the system evaluates $f(a)$ to produce an interval result $f'(a)$. It also evaluates $f(b)$ to produce an interval result $f'(b)$. The system then evaluates a termination condition for the processing of the current interval X, wherein the termination condition is TRUE if a number of sub-conditions are satisfied, including if $f'(a)$ contains zero and if $f'(b)$ contains zero. If the termination condition is TRUE, the system terminates the processing of the current interval X, and records X as a final bound.

36 Claims, 6 Drawing Sheets

OTHER PUBLICATIONS

R. B. Kearfott and M. Novoa III, "Algorithm 681: INTBIS, A portable interval Newton/bisection package", ACM Trans. Math. Software, vol. 16, no. 2, pp. 152–147. http://www.netlib.org/toms/681.

R. B. Kearfott, M. Dawande, K.S. Du, and C. Hu, "Algorithm 737: INTLIB: A Portable Fortran 737 Interval Standard Function Library," ACM Trans. Math. Software, 20, vol. 4, Dec. 1994, pp. 447–458.

R. B. Kearfott and G.W. Walster, "On Stopping Criteria in Verified Nonlinear Systems or Optimization Algorithms," ACM Trans. Math. Software, 26, vol. 3, Sep. 2000, pp. 323–351. The publication itself says Received: Jul. 1999; revised: Mar. 2000; accepted: Mar. 2000. http:/interval.louisiana.edu/preprints.html.

R.E. Moore and S.T. Jones "Safe Starting Regions for Iterative Methods", SIAM Journal on Numerical Analysis, vol. 14, No. 6 (Dec. 1977), pp. 1051–1065.

A. Neumaier, "The Enclosure of Solutions of Parameter–Dependent Systems of Equations," Cambridge University Press, Cambridge, 1990, ISBN: 0–12–505630–3, Reliability in Computing pp. 269–286.

S.M. Rump, "Verification Methods for Dense and Sparse Systems of Equations," in Topics in Validated Computations: Proceedings of the IMACS–GAMM International Workshop on Validated Computations, University of Oldenburg, J. Herzberger, ed., Elsevier Studies in Computational Mathematics, Elsevier, 1994, pp. 63–136.

* cited by examiner $X \equiv [\underline{x}, \bar{x}] \equiv \{x \in \Re^* | \underline{x} \leq x \leq \bar{x}\}$ $Y \equiv [\underline{y}, \bar{y}] \equiv \{y \in \Re^* | \underline{y} \leq y \leq \bar{y}\}$ (1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X/Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})], \text{ if } 0 \notin Y$ $X/Y \subseteq \Re^*, \text{ if } 0 \in Y$

FIG. 5

TERMINATION CRITERIA FOR THE ONE-DIMENSIONAL INTERVAL VERSION OF NEWTON'S METHOD

BACKGROUND

1. Field of the Invention

The present invention relates to performing arithmetic operations on interval operands within a computer system. More specifically, the present invention relates to a method and an apparatus for finding the roots of a nonlinear equation of one variable using the interval version of Newton's method.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers.)

One commonly performed computational operation is to find the roots of a nonlinear equation using Newton's method. The interval version of Newton's method works in the following manner. From the mean value theorem, $$f(x)-f(x^*)=(x-x^*)f'(\xi),$$

where $\xi$ is some generally unknown point between x and $x^*$. If $x^*$ is a zero of $f$, then $f(x^*)=0$ and, from the previous equation, $$x^*=x-f(x)/f'(\xi).$$

Let X be an interval containing both x and $x^*$. Since $\xi$ is between x and $x^*$, it follows that $\xi \in X$ Moreover, from basic properties of interval analysis it follows that $f'(\xi) \in f'(X)$. Hence, $x^* \in N(x,X)$ where $$N(x,X)=x-f(x)/f'(X).$$

Temporarily assume $0 \notin f'(X)$ so that $N(x,X)$ is a finite interval. Since any zero of $f$ in X is also in $N(x,X)$, the zero is in the intersection $X \cap N(x,X)$. Using this fact, we define an algorithm for finding zero $x^*$. Let $X_0$ be an interval containing $x^*$. For n=0, 1, 2, . . . , define $$x_n=m(X_n)$$

$$N(x_n,X_n)=x_n-f(x_n)/f'(X_n)$$

$$X_{n+1}=X_n \cap N(x_n,X_n),$$

wherein m(X) is the midpoint of the interval X. We call $x_n$ the point of expansion for the Newton method. It is not necessary to choose $x_n$ to be the midpoint of $X_n$. The only requirement is that $x_n \in X_n$ to assure that $x^* \in N(x_n,X_n)$. However, it is convenient and efficient to choose $x_n=m(X_n)$.

Roots of an interval equation can be intervals rather than points when the equation contains non-degenerate interval constants or parameters. Suppose the interval version of Newton's method to find the roots of a single nonlinear equation has not yet satisfied the user-specified convergence tolerances. Then it is difficult to distinguish between the following three situations:

a) the current interval is a tight enclosure of a single interval root;

b) the current interval contains sufficiently distinct interval roots that they can be isolated with a reasonable amount of effort; and c) the current interval contains point and/or interval roots that are so close to being indistinguishable that the effort to isolate them is unreasonably large with the existing wordlength.

What is needed is a method and an apparatus for terminating the interval version of Newton's root finding method before iterations lose their practical value in isolating meaningfully distinct interval roots.

SUMMARY

One embodiment of the present invention provides a system for finding zeros of a function, $f$ within an interval, X, using the interval version of Newton's method. The system operates by receiving a representation of the interval X. This representation including a first floating-point number, a, representing the left endpoint of X, and a second floating-point number, b, representing the right endpoint of X. Next, the system performs an interval Newton step on X, wherein the point of expansion is the midpoint, x, of the interval X. Note that performing the interval Newton step involves evaluating $f(x)$ to produce an interval result $f'(x)$. If $f'(x)$ contains zero, the system evaluates $f(a)$ to produce an interval result $f'(a)$. It also evaluates $f(b)$ to produce an interval result $f'(b)$. The system then evaluates a termination condition for the processing of the current interval X, wherein the termination condition is TRUE if a number of sub-conditions are satisfied, including if $f'(a)$ contains zero and if $f'(b)$ contains zero. If the termination condition is TRUE, the system terminates the processing of the current interval X, and records X as a final bound.

In one embodiment of the present invention, if $f'(a)$ does not contain zero, evaluating $f(a)$ additionally involves performing an interval Newton step wherein the point of expansion is a.

In one embodiment of the present invention, if $f'(b)$ does not contain zero, evaluating $f(b)$ additionally involves performing an interval Newton step wherein the point of expansion is b.

In one embodiment of the present invention, if $f'(x)$ contains zero and if $f'(X)$ contains zero, the termination condition for processing the current interval X is TRUE if $f'(a)$ contains zero, $f'(b)$ contains zero, $f'(x_1)$ contains zero and if $f'(x_2)$ contains zero. Note that $x_1$ is the midpoint between a and x; and $x_2$ is the midpoint between x and b.

In one embodiment of the present invention, if $f'(x)$ contains zero and if $f'(X)$ contains zero, and if either $f'(x_1)$ or $f'(x_2)$ does not contain zero, the system additionally splits the interval X in half and applies the interval Newton method to each half separately.

In one embodiment of the present invention, in the case where $f'(x)$ does not contain zero and if $f'(X)$ contains zero, if the width of the interval X divided by the magnitude of the interval X is less than a first threshold value, and the magnitude of $f(X)$ is less than a second threshold value, the method further comprises terminating the processing of the current interval X, and recording X as a final bound.

In one embodiment of the present invention, if a given Newton step does not reduce the width of an interval by at least half, the system additionally splits the interval in half and applies the interval Newton method to each half separately.

In one embodiment of the present invention, if an interval Newton step results in two intervals, the system additionally applies the interval Newton method to each of the two intervals separately.

In one embodiment of the present invention, if the result of an interval Newton step is the empty interval, the system returns to process another interval.

In one embodiment of the present invention, if $f'(a)$ contains zero and if $f'(b)$ contains zero, the system returns to process another interval.

In one embodiment of the present invention, if $f'(a)$ does not contain zero or if $f'(b)$ does not contain zero, the system performs an interval Newton step wherein the point of expansion is the midpoint of the interval X. If the result of this interval Newton step is the empty interval, the system returns to process another interval.

In one embodiment of the present invention, the system terminates the processing of the current interval X after a predetermined number of iterations.

BRIEF DESCRIPTION OF THE FIGURES

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
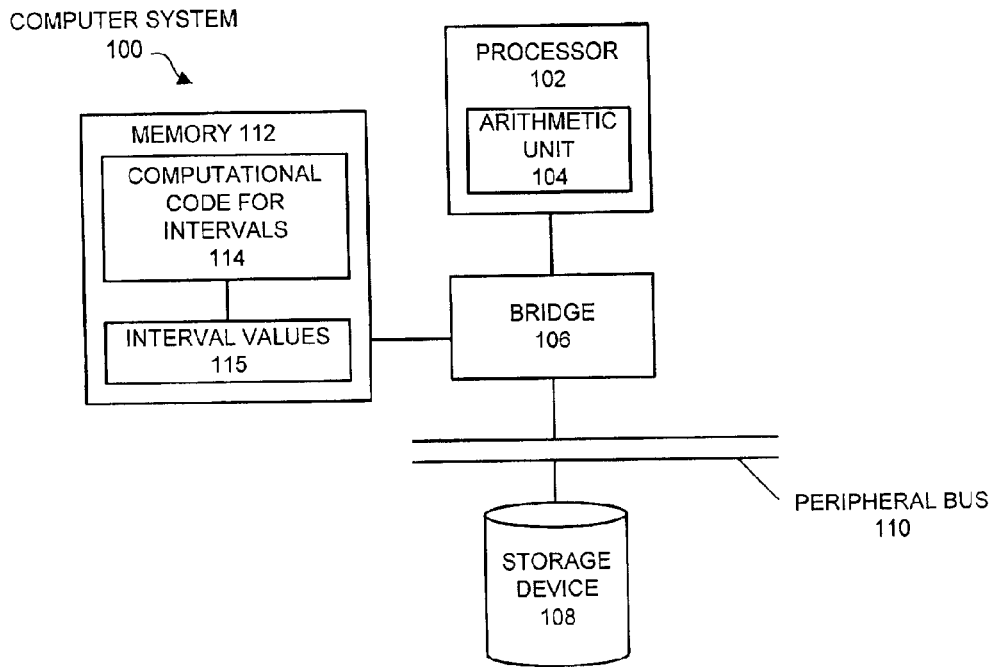
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
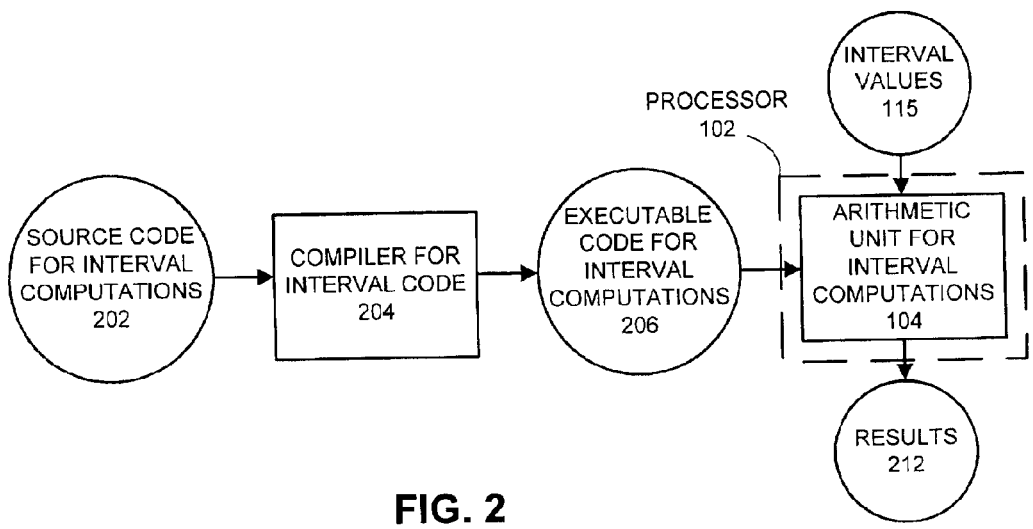
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
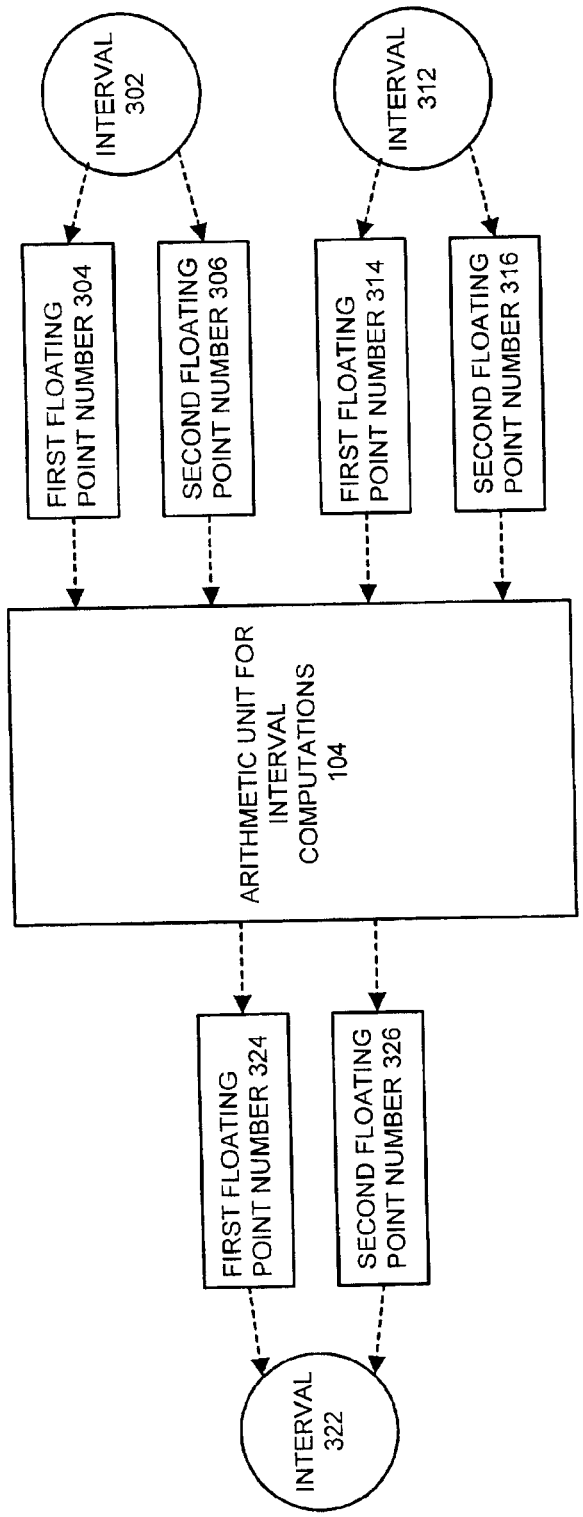
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454, which are hereby incorporated by reference in order to provide details on the construction of such an arithmetic unit. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
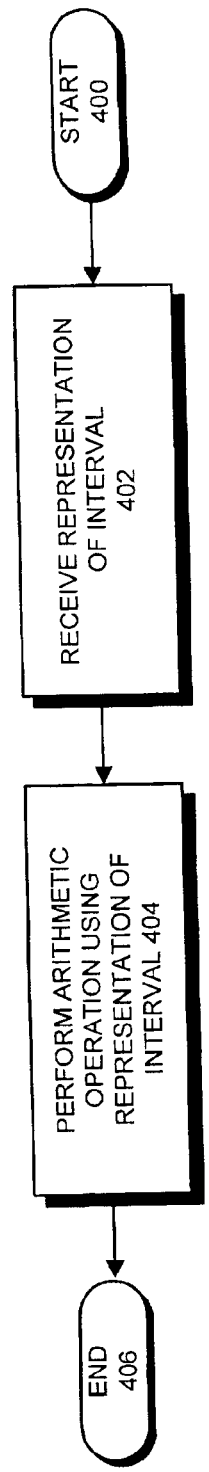
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed subset of the extended (including $-\infty$ and $+\infty$) real numbers R* (see line 1 of FIG. 5). Similarly the interval Y also has two endpoints and is a closed subset of the extended real numbers R* (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points negative infinity and positive infinity:

$$R^* = R \cup \{-\infty\} \cup \{+\infty\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Interval Version of Newton's Method

Figure 6:
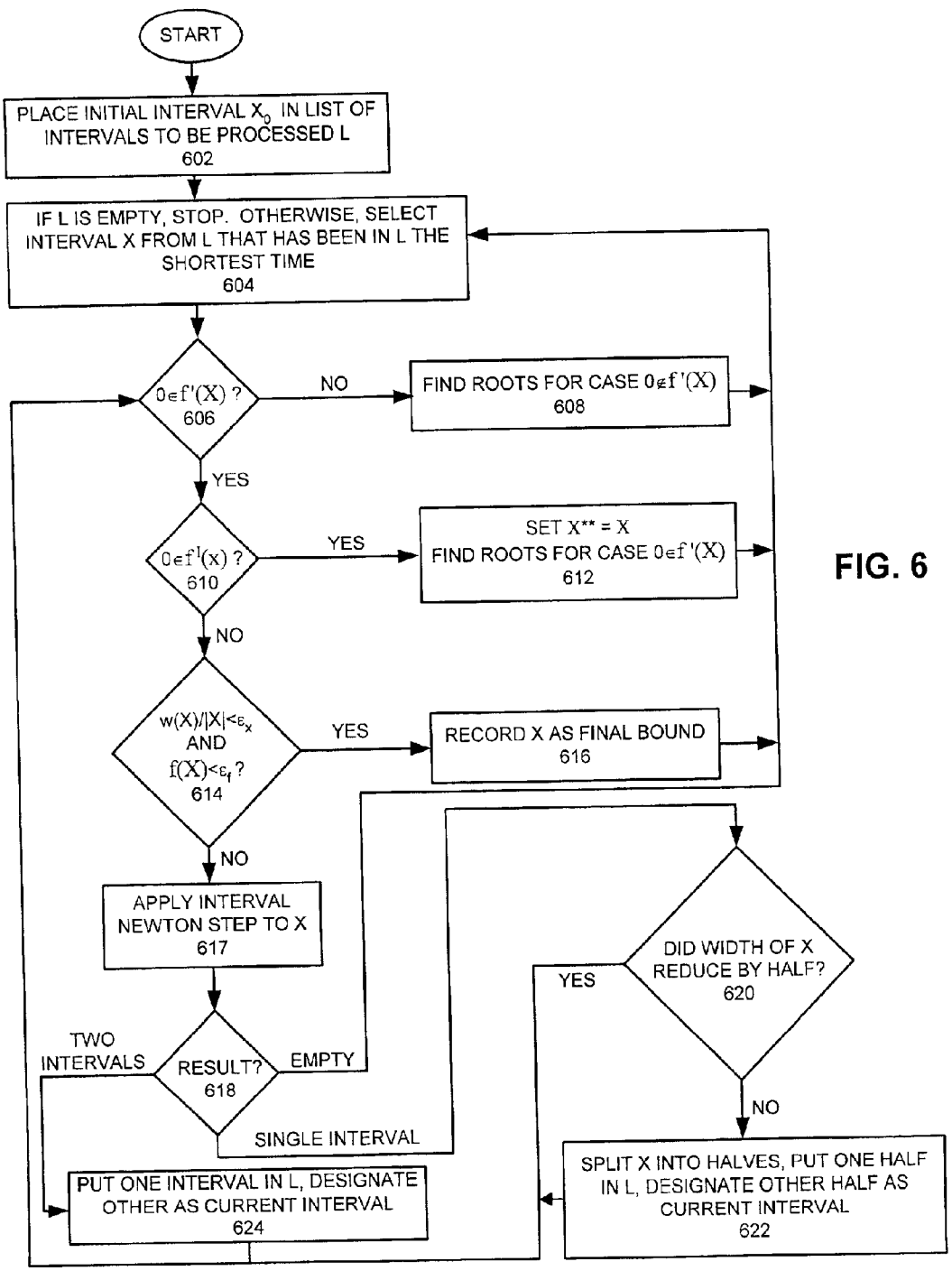
FIG. 6 illustrates the process of solving for zeros of a function using the interval Newton method in accordance with an embodiment of the present invention.

FIG. 6 illustrates the process of solving for zeros of a function using the interval version of Newton's method in accordance with an embodiment of the present invention. The system starts with an initial interval $X_0$ and stopping tolerances $\epsilon_X$ and $\epsilon_F$. The system stops when interval bounds for all zeros of $f$ in $X_0$ have been found. After termination, the bounds on any simple zero generally approximate the optimal bound. If the tolerances $\epsilon_X$ and $\epsilon_F$ are not chosen too small, then each multiple zero of $f$ in $X_0$ is generally isolated within an interval of relative width less than $\epsilon_X$. Also, we generally have $|f(x)| < \epsilon_F$ for all points x in an interval bounding a zero.

In the following description, the current interval is denoted by X at each step although X changes from step to step. Also, x denotes the midpoint m(X) so x changes as well. Note that except for a few cases described below, the Newton step is generally defined by an expansion about x.

The system starts by placing the initial interval, $X_0$, in a list of intervals to be processed, L (step 602).

If L is empty, the system stops. Otherwise, the system selects the interval X, from L that has been in L for the shortest amount of time, and the system deletes X from L (step 604).

Next, the system determines if the derivative of f which is represented as $f'$, when evaluated over the interval X contains zero. In other words, is $0 \in f'(X)$? (step 606). If not, the system finds roots for the case where $f'(X)$ does not contain zero (step 608). The operations involved in solving for this case are described in more detail with reference to FIG. 7 below. The system then returns to step 604 process additional intervals if necessary.

If $f'(X)$ contains zero at step 606, the system determines whether $f^I(x)$ contains zero (step 610). Note that $f^I(x)$ denotes the interval resulting from an evaluation of $f(x)$. If the conditions in both steps 606 and 610 are true, the system finds the roots of $f$ for the case where $f'(X)$ does not contain zero (step 612). The operations involved in solving for this case are described in more detail with reference to FIG. 8 below. The system then returns to step 604 to process additional intervals if necessary.

If $f^I(x)$ does not contain zero at step 610, the system performs tests involving the stopping tolerances $\epsilon_X$ and $\epsilon_F$ (step 614). If the width of the interval X(denoted as w(X)) divided by the magnitude of X (denoted as |X|)is less than $\epsilon_X$, and if the magnitude of $f(X)$ (denoted as $|f(X)|$) is less than $\epsilon_F$, the system records X as a final bound (step 616) and returns to step 604 to process additional intervals if necessary. Note that the width of the interval X=[a,b] (denoted as w(X)) is simply b−a. Also note that the magnitude of an interval X=[a, b] (denoted by |X|) is the maximum value of |x| for all x ∈ X. Thus, |X|=max(|a|,|b|). Furthermore, note that the stopping tolerances, $\epsilon_X$ and $\epsilon_F$, are used to stop the system from performing further computations when the interval bound on a zero of $f$ is sufficiently narrow.

If at step 614 one or both of the tested quantities is greater than or equal to the corresponding stopping tolerance, the system applies the interval Newton step to the interval X (step 617).

The system then examines the result of the Newton step (step 618). If the result is empty, the system returns to step 604 to process additional intervals, if necessary. If the result is a single interval, the system determines whether the Newton step reduced the interval X by at least half in size (step 620). If so, the system returns to step 606 to continue processing the current interval X. Otherwise, the system splits X into halves, puts one half into the list of intervals to be processed, L, and designates the other half as the current interval X (step 622). The system then returns to step 606 to continue processing the current interval X.

If the result of the Newton step at step 618 is two intervals, the system puts one of the two intervals into the list of intervals to be processed, L, and designates the other interval as the current interval, X (step 624). The system then returns to step 606 to continue processing the current interval X.

Case Where $0 \notin f'(X)$

Figure 7:
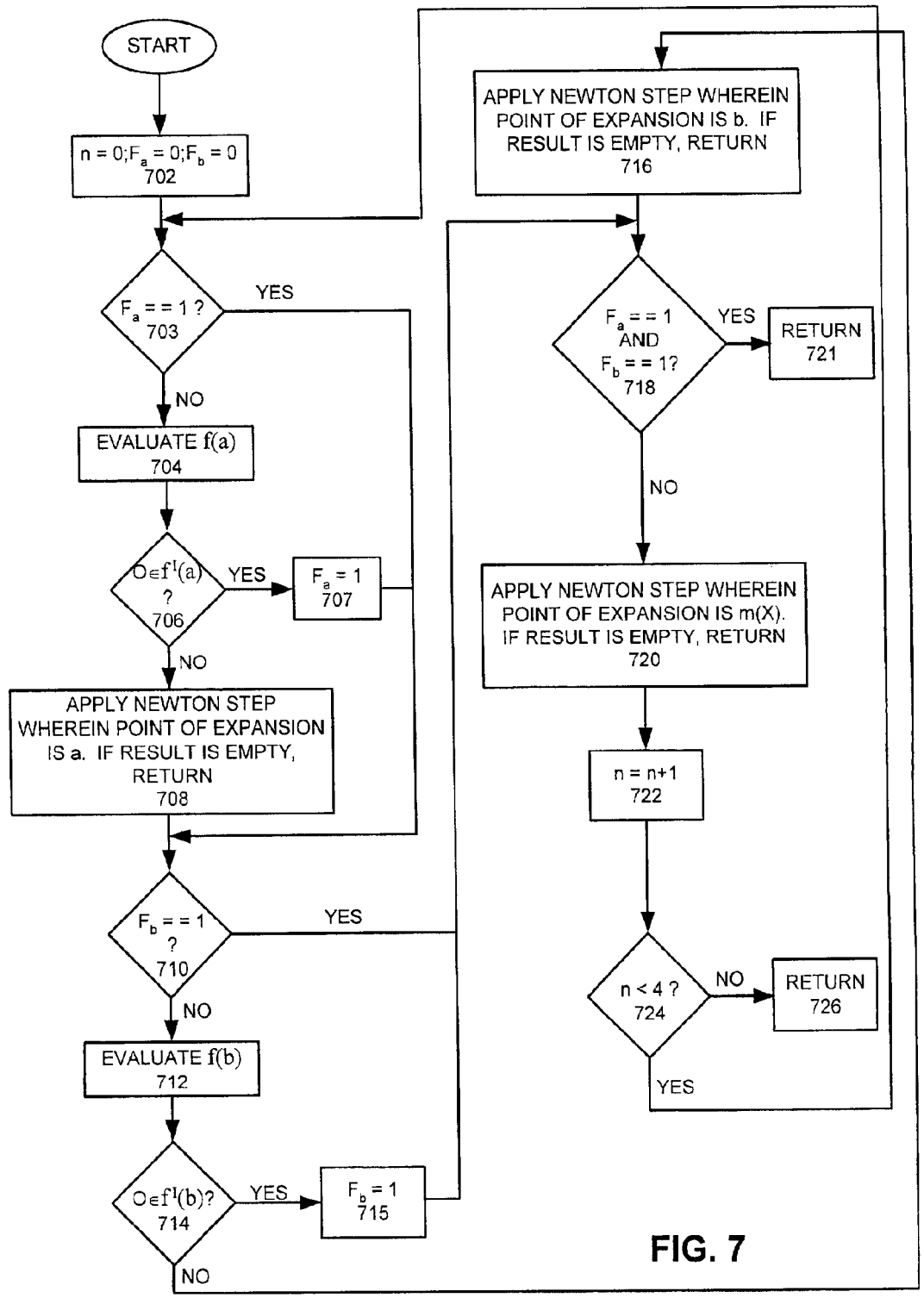
FIG. 7 illustrates the interval Newton method for the case where the derivative of the function does not contain zero in accordance with an embodiment of the present invention.

FIG. 7 illustrates the interval Newton method for the case where the derivative of the function does not contain zero in accordance with an embodiment of the present invention. This flow chart illustrates in more detail the operations carried out at step 608 of FIG. 6.

Note that the relation $0 \notin f'(X)$ assures that there is no more than one point or interval zero of $f$ in X. Moreover, if there is a zero of $f$ in X, then it is a simple one. Also note that inclusion isotonicity assures that $0 \notin f'(X')$ for any interval X' contained in X.

The system starts by initializing a counter variable, n, and two flags, $F_a$ and $F_b$, to zero (step 702). Note that the system sets $F_a=1$ when $0 \in f'(a)$. Similarly, the system sets $F_b=1$ when $0 \in f'(b)$. Also note that the system cycles through the operations listed below no more than four times. The integer n counts the cycles.

After initializing the variables in step 702, the system tests $F_a$ to see if $F_a==1$ (step 703). If $F_a==1$, the system proceeds to step 710 to test flag $F_b$. On the other hand, if $F_a \neq 1$ at step 703, the system evaluates $f(a)$ to produce the resulting interval $f^I(a)$ (step 704). Next, the system determines if $f^I(a)$ contains zero (step 706). If so, the system sets $F_a=1$ (step 707) and proceeds to step 710 to test flag $F_b$. If at step 706 $f^I(a)$ does not contain zero, the system applies an interval Newton step wherein the point of expansion is "a" (step 708). If the result of this expansion is the empty interval, the system returns to process the next interval.

Otherwise, the system tests $F_b$ to see if $F_b==1$ (step 710). If $F_b==1$, the system proceeds to step 718 to test both flags $F_a$ and $F_b$. On the other hand, if $F_b \neq 1$ at step 710, the system evaluates $f(b)$ to produce the resulting interval $f^I(b)$ (step 712). Next, the system determines if $f^I(b)$ contains zero (step 714). If so, the system sets $F_b=1$ (step 715) and proceeds to step 718 to test both flags $F_a$ and $F_b$. If at step 714 $f^I(b)$ does not contain zero, the system applies an interval Newton step wherein the point of expansion is "b" (step 716). If the result of this expansion is the empty interval, the system returns to process the next interval. Let x be the midpoint of X that satisfies the condition $0 \in f^I(x)$ in step 610. x is set in step 612. Note that if x** is no longer an element of X, the system uses the midpoint of the current X, m(X), as the point of expansion.

Otherwise, the system tests to see if both $F_a==1$ and $F_b==1$ (step 718). If both $F_a==1$ and $F_b==1$, the bounds, a and b, on the zero of $f$ are as tight as they are likely to become. Hence, the system returns to process the next interval (step 721).

Otherwise, the system applies an interval Newton step wherein the point of expansion is m(X) (step 720). If the result of this expansion is the empty interval, the system returns to process the next interval. Next, the system increments n (step 722) and tests to see if n<4 (step 724). If $n \geq 4$, the system returns to process the next interval because the bounds on the zero are unlikely to be further tightened by additional processing (step 726). Otherwise, if n<4, the system returns to step 703 to repeat the process.

Case Where $0 \in f'(X)$

Figure 8:
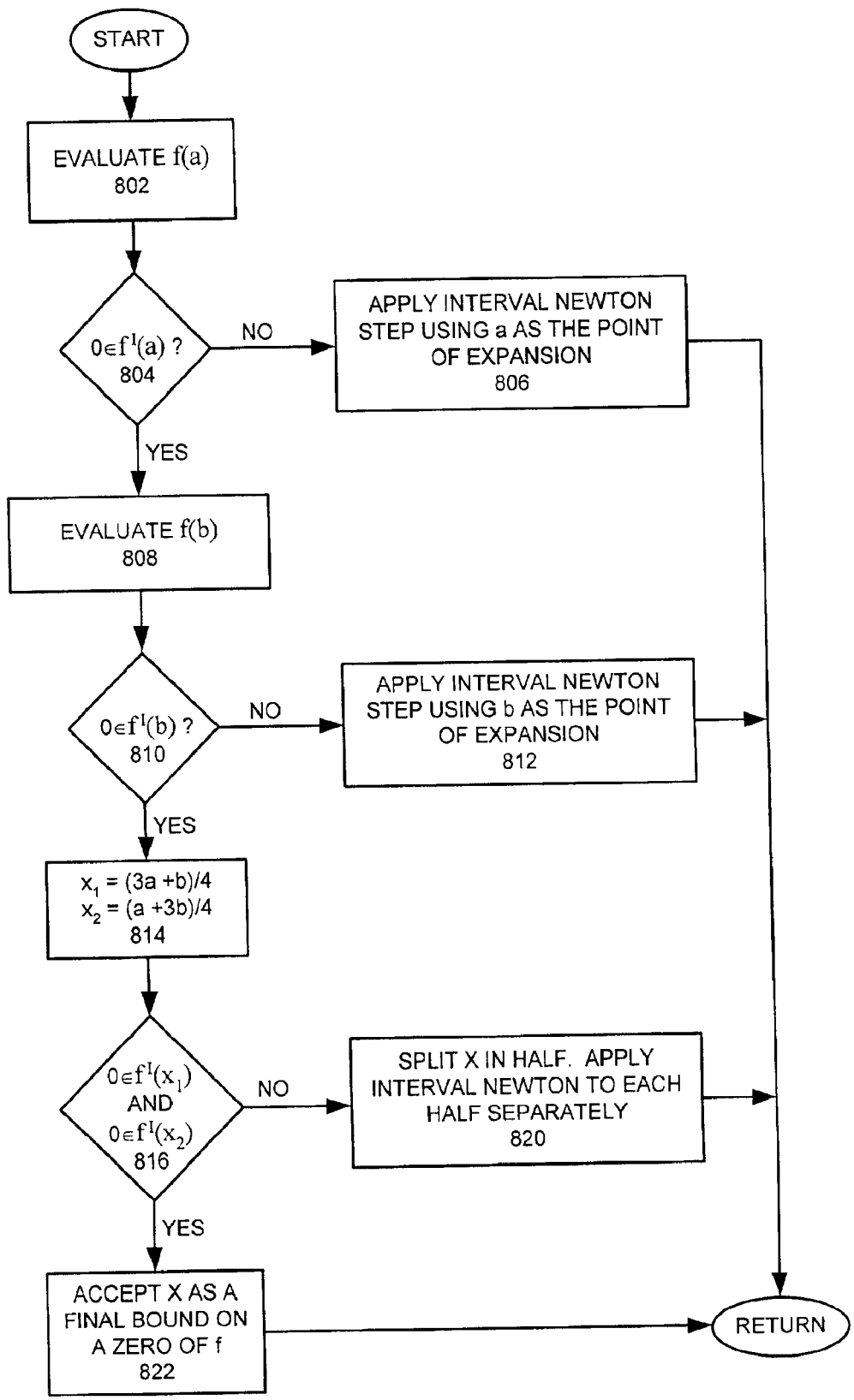
FIG. 8 illustrates the interval Newton method for the case where the derivative of the function contains zero in accordance with an embodiment of the present invention.

FIG. 8 illustrates the interval Newton method for the case where the derivative of the function contains zero and $0 \in f'(x)$ in accordance with an embodiment of the present invention. This flow chart illustrates in more detail the operations carried out at step 612 of FIG. 6.

The system first evaluates $f(a)$ to produce the resulting interval $f'(a)$ (step 802). Next, the system determines if $f'(a)$ contains zero (step 804). If not, the system applies an interval Newton step wherein the point of expansion is "a" (step 806) and returns to the main program.

On the other hand, if $f'(a)$ contains zero, the system evaluates $f(b)$ to produce the resulting interval $f'(b)$ (step 808). Next, the system determines if $f'(b)$ contains zero (step 810). If not, the system applies an interval Newton step wherein the point of expansion is "b" (step 812) and returns to the main program.

On the other hand, if $f'(b)$ contains zero, the system next finds the centers, $x_1$ and $x_2$, of the two halves of the interval X by computing $x_1=(3a+b)/4$ and $X_2=(a+3b)/4$ (step 814). The system then evaluates the functions $f$ at each of the centers, $x_1$ and $x_2$, to produce the resulting intervals $f'(x_1)$ and $f'(x_2)$. Next, the system determines if both $f(x_1)$ contains zero and $f(x_2)$ contains zero (step 816). If so, the computed (interval) value of $f$ contains zero for each of the five equally spaced points, a, $x_1$, m(X), $x_2$ and b. In this case, additional processing is unlikely to narrow the X further. Hence, the system accepts X as a final bound on a zero of $f$ (step 822).

On the other hand, if either $f'(x_1)$ or $f'(x_2)$ does not contain zero, the system splits the interval X in half, and applies the interval Newton method to each half separately (step 820).

Note that the system can also make use of higher precision interval arithmetic to help resolve the uncertainty when $0 \in f'(x)$ and $0 \in f'(X)$.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art.

For example, in the computational process described above with reference to FIG. 6, it is possible to process intervals in the list, L, in parallel using multiple concurrently executing processors. Furthermore, it is possible to subdivide the initial interval into multiple smaller sub-intervals so that the multiple sub-intervals can be processed in parallel.

In another embodiment of the present invention, if the function, $f$, has already been evaluated at a right endpoint or a left endpoint of an interval, X, the system saves the result of this evaluation in the list, L, so that the function does not have to be reevaluated at the right endpoint or left endpoint of X.

Hence, the above disclosure is not intended to limit the present invention. The scope of the present invention is defined by the appended claims.

What is claimed is:

1. A computer implemented method for finding zeros of a function, $f$, within an interval, X, using the interval version of Newton's method, wherein $f'$ is the derivative of the function $f$, the method comprising:

receiving a representation of the interval X, the representation including a first floating-point number, a, representing the left endpoint of X, and a second floating-point number, b, representing the right endpoint of X;

storing the representation in a memory of the computer system;

performing an interval Newton step on X, wherein the point of expansion is the midpoint, x, of the interval X, and wherein performing the interval Newton step involves evaluating $f(x)$ to produce an interval result $f'(x)$; and if $f'(x)$ contains zero, evaluating $f(a)$ to produce an interval result $f'(a)$, evaluating $f(b)$ to produce an interval result $f'(b)$, evaluating a termination condition for the processing of the current interval X, wherein the termination condition is TRUE if a number of conditions are satisfied, including if $f'(a)$ contains zero and if $f'(b)$ contains zero, and if the termination condition is TRUE, terminating the processing of the current interval X, and recording X in the memory as a final bound.

2. The method of claim 1, wherein if $f'(a)$ does not contain zero, evaluating $f(a)$ additionally involves performing an interval Newton step wherein the point of expansion is a.

3. The method of claim 1, wherein if $f'(b)$ does not contain zero, evaluating $f(b)$ additionally involves performing an interval Newton step wherein the point of expansion is b.

4. The method of claim 1, wherein if $f'(x)$ contains zero and $f'(X)$ contains zero, the termination condition for processing the current interval X is TRUE if $f'(a)$ contains zero, $f'(b)$ contains zero, $f'(x_1)$ contains zero and $f'(x_2)$ contains zero;

wherein $x_1$ is the midpoint between a and x; and wherein $x_2$ is the midpoint between x and b.

5. The method of claim 4, wherein if $f'(x)$ contains zero and if $f'(X)$ contains zero, and if either $f'(x_1)$ or $f'(x_2)$ does not contain zero, the method further comprises:

splitting the interval X in half; and applying the interval Newton method to each half separately.

6. The method of claim 1, wherein if $f'(x)$ does not contain zero and if $f'(X)$ contains zero, the method further comprises terminating the processing of the current interval X, and recording X as a final bound on condition that:

the width of the interval X divided by the magnitude of the interval X is less than a first threshold value; and the magnitude of $f(X)$ is less than a second threshold value.

7. The method of claim 1, wherein if a given Newton step does not reduce the width of an interval by at least half, the method further comprises splitting the interval in half and applying the interval Newton method to each of the two halves separately.

8. The method if claim 1, wherein if an interval Newton step results in two intervals, the method further comprises applying the interval Newton method to each of the two intervals separately.

9. The method of claim 1, wherein if the result of an interval Newton step is the empty interval, the method returns to process another interval.

10. The method of claim 1, wherein if $f'(a)$ contains zero and if $f'(b)$ contains zero, the method returns to process another interval.

11. The method of claim 1, wherein if $f'(a)$ does not contain zero or if $f'(b)$ does not contain zero, the method further comprises performing an interval Newton step wherein the point of expansion is the midpoint of the interval X; and wherein if the result of the interval Newton step about the midpoint is the empty interval, the method returns to process another interval.

12. The method of claim 11, further comprising terminating the processing of the current interval X after a predetermined number of iterations.

13. A computer-readable storage medium storing instructions that when executed by a computer cause the computer to perform a method for finding zeros of a function, $f$, within an interval, X, using the interval version of Newton's method, wherein $f'$ is the derivative of the function $f$, the method comprising:

receiving a representation of the interval X, the representation including a first floating-point number, a, representing the left endpoint of X, and a second floating-point number, b, representing the right endpoint of X;

performing an interval Newton step on X, wherein the point of expansion is the midpoint, x, of the interval X, and wherein performing the interval Newton step involves evaluating $f(x)$ to produce an interval result $f'(x)$; and if $f'(x)$ contains zero,
  evaluating $f(a)$ to produce an interval result $f'(a)$,
  evaluating $f(b)$ to produce an interval result $f'(b,)$,
  evaluating a termination condition for the processing of the current interval X, wherein the termination condition is TRUE if a number of conditions are satisfied, including if $f'(a)$ contains zero and if $f'(b)$ contains zero, and
  if the termination condition is TRUE, terminating the processing of the current interval X, and recording X as a final bound.

14. The computer-readable storage medium of claim 13, wherein if $f'(a)$ does not contain zero evaluating $f(a)$ additionally involves performing an interval Newton step wherein the point of expansion is a.

15. The computer-readable storage medium of claim 13, wherein if $f'(b)$ does not contain zero, evaluating $f(b)$ additionally involves performing an interval Newton step wherein the point of expansion is b.

16. The computer-readable storage medium of claim 13, wherein if $f'(x)$ contains zero and $f'(X)$ contains zero, the termination condition for processing the current interval X is TRUE if $f'(a)$ contains zero, $f'(b)$ contains zero, $f'(x_1)$ contains zero and $f'(x_2)$ contains zero;

wherein $x_1$ is the midpoint between a and x; and wherein $x_2$ is the midpoint between x and b.

17. The computer-readable storage medium of claim 16, wherein if $f'(x)$ contains zero and if $f'(X)$ contains zero, and if either $f'(x_1)$ or $f'(x_2)$ does not contain zero, the method further comprises:

splitting the interval X in half; and applying the interval Newton method to each half separately.

18. The computer-readable storage medium of claim 13, wherein if $f'(x)$ does not contain zero and if $f'(X)$ contains zero, the method further comprises terminating the processing of the current interval X, and recording X as a final bound on condition that:

the width of the interval X divided by the magnitude of the interval X is less than a first threshold value; and the magnitude of $f(X)$ is less than a second threshold value.

19. The computer-readable storage medium of claim 13, wherein if a given Newton step does not reduce the width of an interval by at least half, the method further comprises splitting the interval in half and applying the interval Newton method to each of the two halves separately.

20. The computer-readable storage medium if claim 13, wherein if an interval Newton step results in two intervals, the method further comprises applying the interval Newton method to each of the two intervals separately.

21. The computer-readable storage medium of claim 13, wherein if the result of an interval Newton step is the empty interval, the method returns to process another interval.

22. The computer-readable storage medium of claim 13, wherein if $f'(a)$ contains zero and if $f'(b)$ contains zero, the method returns to process another interval.

23. The computer-readable storage medium of claim 13, wherein if $f'(a)$ does not contain zero or if $f'(b)$ does not contain zero, the method further comprises performing an interval Newton step wherein the point of expansion is the midpoint of the interval X; and wherein if the result of the interval Newton step about the midpoint is the empty interval, the method returns to process another interval.

24. The computer-readable storage medium of claim 13, wherein the method further comprises terminating the processing of the current interval X after a predetermined number of iterations.

25. An apparatus that finds zeros of a function, $f$, within an interval, X, using the interval version of Newton's method, wherein $f'$ is the derivative of the function $f$, the apparatus comprising:

a receiving mechanism that is configured to receive a representation of the interval X, the representation including a first floating-point number, a, representing the left endpoint of X, and a second floating-point number, b, representing the right endpoint of X;

a storing mechanism configured to store the representation in a memory of the computer system;

an interval Newton mechanism that is configured to perform an interval Newton step on X, wherein the point of expansion is the midpoint, x, of the interval X, and wherein performing the interval Newton step involves evaluating $f(x)$ to produce an interval result $f'(x)$; and wherein if $f'(x)$ contains zero, the interval Newton mechanism is configured to,
  evaluate $f(a)$ to produce an interval result $f'(a)$,
  evaluate $f(b)$ to produce an interval result $f'(b)$,
  evaluate a termination condition for the processing of the current interval X, wherein the termination condition is TRUE if a number of conditions are satisfied, including if $f'(a)$ contains zero and if $f'(b)$ contains zero, and
  if the termination condition is TRUE, to terminate the processing of the current interval X, and to record X in the memory as a final bound.

26. The apparatus of claim 25, wherein while evaluating $f(a)$ to produce the interval result $f'(a)$, the interval Newton mechanism is additionally configured to perform an interval Newton step wherein the point of expansion is a if $f'(a)$ does not contain zero.

27. The apparatus of claim 25, wherein while evaluating $f(b)$ to produce the interval result $f'(b)$ the interval Newton mechanism is additionally configured to perform an interval Newton step wherein the point of expansion is b if $f'(b)$ does not contain zero.

28. The apparatus of claim 25, wherein if $f'(x)$ contains zero and $f'(X)$ contains zero, the termination condition for processing the current interval X is TRUE if $f'(a)$ contains zero, $f'(b)$ contains zero, $f'(x_1)$ contains zero and $f'(x_2)$ contains zero;

wherein $x_1$ is the midpoint between a and x; and wherein $x_2$ is the midpoint between x and b.

29. The apparatus of claim 28, wherein if $f'(x)$ contains zero and if $f'(X)$ contains zero, and if either $f'(x_1)$ or $f'(x_2)$ does not contain zero, the interval Newton mechanism is additionally configured to:

split the interval X in half; and to apply the interval Newton method to each half separately.

30. The apparatus of claim 25, wherein if $f'(x)$ does not contain zero and if $f'(X)$ contains zero, the interval Newton mechanism is additionally configured to terminate the processing of the current interval X, and to record X as a final bound on condition that:

the width of the interval X divided by the magnitude of the interval X is less than a first threshold value; and the magnitude of $f(X)$ is less than a second threshold value.

31. The apparatus of claim 25, wherein if a given Newton step does not reduce the width of an interval by at least half, the interval Newton mechanism is additionally configured to split the interval in half, and to apply the interval Newton method to each of the two halves separately.

32. The apparatus if claim 25, wherein if an interval Newton step results in two intervals, the interval Newton mechanism is additionally configured to apply the interval Newton method to each of the two intervals separately.

33. The apparatus of claim 25, wherein if the result of an interval Newton step is the empty interval, the interval Newton mechanism is additionally configured to return to process another interval.

34. The apparatus of claim 25, wherein if $f'(a)$ contains zero and if $f'(b)$ contains zero, the interval Newton mechanism is additionally configured to return to process another interval.

35. The apparatus of claim 25, wherein if $f'(a)$ does not contain zero or if $f'(b)$ does not contain zero, the interval Newton mechanism is additionally configured to perform an interval Newton step wherein the point of expansion is the midpoint of the interval X; and wherein if the result of the interval Newton step about the midpoint is the empty interval, the interval Newton mechanism is additionally configured to return to process another interval.

36. The apparatus of claim 35, wherein the interval Newton mechanism is additionally configured to terminate the processing of the current interval X after a predetermined number of iterations.

* * * * *